US006870816B1

(12) United States Patent
Edwards et al.

(10) Patent No.: US 6,870,816 B1
(45) Date of Patent: Mar. 22, 2005

(54) SELF-ORGANIZING NETWORK WITH DECISION ENGINE AND METHOD

(75) Inventors: Carson P. Edwards, Phoenix, AZ (US); David G. Leeper, Scottsdale, AZ (US); Robert I. Foster, Mesa, AZ (US); Ray O. Waddoups, Mesa, AZ (US); Sam Mordachai Daniel, Tempe, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/516,479

(22) Filed: Mar. 1, 2000

(51) Int. Cl.$^7$ ............................................... H04L 12/28
(52) U.S. Cl. ...................... 370/252; 370/328; 370/338; 370/401; 455/13.4; 455/522
(58) Field of Search ................................. 370/254, 328, 370/338, 252, 400, 401, 238, 351, 352, 353, 354, 392; 455/13.4, 522

(56) References Cited

U.S. PATENT DOCUMENTS

| | | | | |
|---|---|---|---|---|
| 4,939,726 A | * | 7/1990 | Flammer et al. ............ | 370/94.1 |
| 5,115,433 A | * | 5/1992 | Baran et al. ................ | 370/94.3 |
| 5,425,049 A | * | 6/1995 | Dent ............................ | 375/202 |
| 5,577,030 A | * | 11/1996 | Oki et al. ..................... | 370/54 |
| 5,652,751 A | * | 7/1997 | Sharony ...................... | 370/227 |
| 5,987,011 A | * | 11/1999 | Toh ............................. | 370/331 |
| 6,278,742 B1 | * | 8/2001 | Sydon et al. ................ | 375/285 |
| 6,643,256 B1 | * | 11/2003 | Shimojo et al. ............ | 370/229 |

FOREIGN PATENT DOCUMENTS

| | | |
|---|---|---|
| WO | WO 96 19887 A | 12/1995 |
| WO | WO 98 45966 A | 4/1998 |
| WO | WO 98 56140 A | 6/1998 |

OTHER PUBLICATIONS

Kwon, et al., Clustering With Power Control, Military Communications Conference Proceedings,. Oct. 31, 1999, Department of Computer Science, California University at Los Angeles, CA, vol. 2, pp. 1424–1428 (5 pages).

* cited by examiner

*Primary Examiner*—Chau Nguyen
*Assistant Examiner*—Duc Duong
(74) *Attorney, Agent, or Firm*—Frank J. Bogacz; Valerie M. Davis

(57) ABSTRACT

A self-organizing network and method of operation includes a plurality of kindred nodes and, in some applications, a hub node communicating data packets from source nodes to destination nodes remote from the source nodes. Each data packet includes information (e.g. priority, number of hops, etc.) and packet handling commands. A source node receives data packets with the information and packet handling commands and adjusts its operation (e.g. transmitting power, frequency, bandwidth, etc.) in a way that allows the network to be self-organizing, self-configuring, and self-healing so that data packets are retransmitted from source nodes to destination nodes with a minimum of hops and delay.

9 Claims, 3 Drawing Sheets

SELF-ORGANIZING NETWORK WITH DECISION ENGINE AND METHOD

FIELD OF THE INVENTION

This invention relates to apparatus and method for wireless communication and more particularly, the present invention relates to apparatus and method for mobile ad-hoc communication networks.

BACKGROUND OF THE INVENTION

Wireless data communication devices, such as wireless modems, LANs, etc., are becoming more and more popular as prices continue to drop and data rates to rise. There are two distinct approaches for enabling mobile wireless communications of packets of data. Here it will be understood that the term "mobile" has the classic meaning of being movable or capable of moving readily.

The first approach is to utilize existing infrastructure, such as cellular networks, traditional voice and data telecommunications networks, or the like. A major problem of this approach is that permanent infrastructure must be provided. Generally, these networks are based on static hierarchies of switches, trunks, feeders, routers, bridges, backbones, base sites, and other network entities. The topology and service coverage areas of these networks must be planned in advance, usually with long lead times. Once installed, the networks can be expensive and time consuming to change. These limitations inhibit the rapid growth, and reconfiguration of today's voice, text, data, and video information services. In situations where an instant infrastructure is needed, as for example in natural disasters, military engagements, etc., this is a serious problem. Another problem of this approach is the problem of handoff. As a mobile host moves out of the range of one base station and into the range of another, how should the connection be smoothly handed over to the new base station without noticeable delay or packet loss.

A second approach, which solves many of the infrastructure problems, is to let users who wish to communicate with each other form an ad-hoc network and collaborate amongst themselves to deliver data packets from a source to its destination, generally via one or more intermediate nodes. This form of networking has several advantages when compared to traditional cellular systems. Generally, a major advantage is that the ad-hoc networks don't rely on hard wired basestations and other fixed infrastructures. A second advantage is that the ad-hoc network is fault tolerant. In a cellular system, a malfunction in a base station impairs all mobiles in its cell. In ad-hoc networks, a malfunction in one node can be easily overcome through network reconfiguration. Also, an ad-hoc network has unconstrained connectivity, i.e. the network is not limited by wiring, physical cabling, etc.

In previous ad-hoc network concepts, each node includes a decision engine which makes near-real-time decisions on packet disposition as a function of one or more typical parameters. The parameters include packet destination address, packet hop count, and packet type. Each node in the network has a unique address and each packet includes the address of its destination node. Each time a packet is repeated (i.e. transmitted to the next node), a hop counter accompanying the packet is incremented. Thus, each node has access to a tally of links or nodes traversed since the packet was originated. As an example of a decision made by the decision engine using this parameter, the packet may include a maximum number of hops which may be initiated. In the previous concepts, packet types included "flood" packets which are to be retransmitted (repeated) as long as the hop count does not exceed some specified maximum carried in the packet, and data packets which are repeated only if the hop count to the destination does not exceed some maximum value.

A major problem with prior art ad-hoc networks is the fact that they are limited in range by the individual node's transmission range. In ad-hoc networks, a message is passed from one node to another node until the destination is reached. Thus, in busy ad-hoc networks or during busy periods, many packets may be directed through additional nodes because of interference (simultaneous transmissions) with other packets, i.e. the destination or a more convenient path is not available. In many instances this can result in many additional hops with each hop using power from the limited power source (generally a battery) of each node that is involved. Also, in many instances a node may use too much power to communicate with an adjacent node or may use to little power so that several small hops result.

Accordingly it is highly desirable to provide apparatus and a method of solving these problems which is inexpensive and easy to use.

BRIEF DESCRIPTION OF THE DRAWINGS

Referring to the drawings.

DESCRIPTION OF THE PREFERRED EMBODIMENTS

The present invention is a self-organizing network that relies on near-real-time decisions for the routing of packetized information among loosely federated network elements. Generally, networks of this type are referred to as ad-hoc networks. For purposes of this disclosure, an ad-hoc network is a collection of mobile hosts which communicate with each other without the presence of any pre-existing network infrastructure. Adjustments needed for growth or reconfiguration are carried out by the individual network elements with little or no centralized authority or control. Network elements include a plurality of kindred nodes and may also include other available nodes, such as hub nodes with exceptionally high power and/or advantageous geographic locations as, for example, mobile vehicles, tower antennas, orbiting satellites, etc.

The term "kindred" is used in this disclosure because each node is an instance of a common familial class of nodes that share a common set of attributes. Kindred nodes are not necessarily identical. Some kindred nodes may be mobile, and some may be fixed. Some may use wireless connections, wired, or both. Some may be short range, and some may be long or very long range. But they all share one common characteristic: by reacting to commands and instructions from local or remote users (at least some of which are generally included in the data packets) by handling packets for themselves and other nodes, and (thereby) sensing the telecommunications environment, the kindred nodes adjust their behavior (e.g. transmitting power, frequency, bandwidth, etc.) in a way that allows the network to be self-organizing, self-configuring, and self-healing.

Hub nodes may have an additional, separate set of trunking frequencies and modulation schemes intended for longer range that are inaccessible to the smaller kindred nodes. Typically, when a hub node repeats a packet, it repeats on both the kindred retransmission frequencies and the hub retransmission frequencies. Except for these additional characteristics, the operation and behavior of the hub and kindred nodes is the same.

Figure 1:
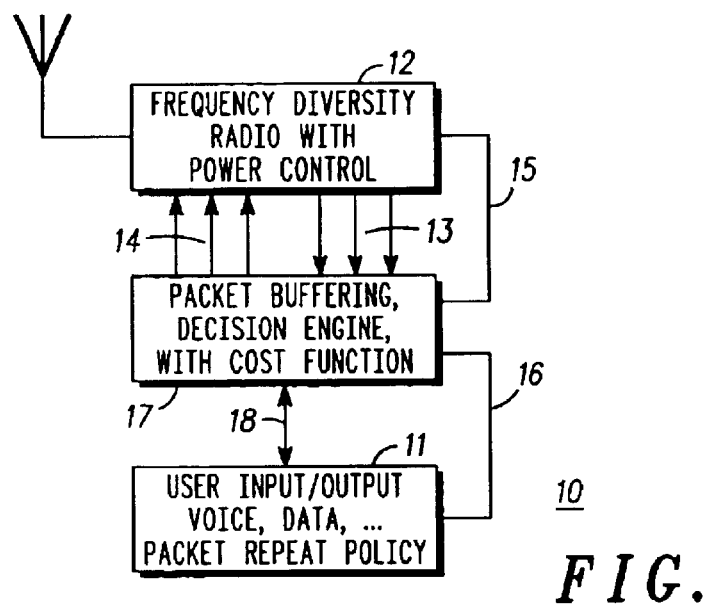
FIG. 1 is a block diagram of a self-organizing network with decision engine in accordance with the present invention.

Turning now to FIG. 1, a block diagram is illustrated of a kindred node 10 as used in a self-organizing network in accordance with the present invention. Kindred node 10 includes three fundamental segments 11, 12, and 17. Segment 11 contains standard elements that allow for user input/output in the form of voice, data, text, video, or other forms. Segment 11 also allows users control over whether and how kindred node 10 may be used by other nodes in the network for repeating packets. It will be understood that users may need this control to conserve the energy in a power pack, to enforce certain security provisions, or to control the cost of the user's services.

Segment 12 contains standard elements that include a frequency-diversity radio with power control. Frequency hopping, spread spectrum, CDMA, FDMA, and multi-band operation are among the well known spectrum-sharing and frequency diversity technologies that may be used in segment 12. Segment 12 also includes power control, bandwidth control, and other standard capabilities that allow kindred node 20 to regulate the number of nodes with which it can communicate. Power control circuits are well known circuits which adjust the amount of power used by power amplifiers or the like in the transmitter to alter the transmission range. As will be understood by those skilled in the art, the power control can be in convenient steps or in a continuous control.

In a simplified example, the power setting is too low when it is set so that no unit or receiver in the network receives the message and the power setting is too high when it is set so that every unit or receiver in the network receives the message. Thus, the decision engine adjusts the power so that an optimum number (generally a small percentage, e.g. 2% to 5%, of the total number of units in a large network including greater than 10 units) of units receive the message. This is readily accomplished by changing the power setting (increasing or decreasing) in steps until the optimum number of receiving units respond directly during a flood. Here it should also be noted that each receiving unit can easily determine, from the received message, the amount of power required to return a message to the interrogating unit and adjust its decision engine accordingly. This determination can be made in several ways, one of which is to simply include a power setting in the message and another of which is to include a circuit in the decision engine which indicates the received power.

An optimum number of receiving units can also be determined by transmitting a test packet from the source node to at least some of the plurality of kindred nodes at a known transmission power (generally a low power). The transmission power is then adjusted, generally in steps, until the destination node acknowledges receipt of the test packet. The number of kindred nodes which received the transmission (number of hops between the source node and the destination node) is then determined. The transmission power is again adjusted until the determined number of kindred nodes plus two additional kindred nodes receive the transmission. The addition of two kindred nodes is to ensure a robust system capable of reliable transmissions between kindred nodes.

Segment 17, which is the decision engine, processes packets of data forwarded from segment 12 via internal links 14 and chooses to pass the packets on to segment 11 via an internal link 18, pass the packets back to segment 12 via internal link 13 for retransmission to other nodes in the network, and/or ignore the packets. Control of the segments is accomplished through a control link 15 connected between segments 12 and 17 and through a control link 16 connected between segments 11 and 17. Segment 17 includes standard logic circuitry and controls that allows the associated node (in this example, kindred node 10) to take on characteristics that can vary from being a simple end-user's host, to being a long range hub, a medium range hub, or a short range hub. Long range hubs can repeat packets for other long or medium range hubs to form self-configuring, nested trunking systems.

Figure 2:
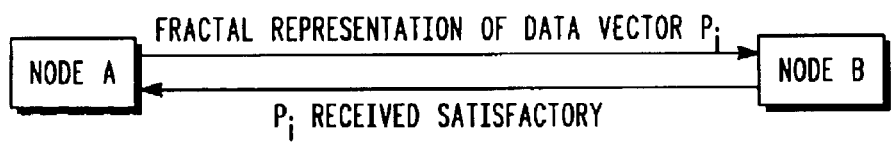
FIG. 2 illustrates fractal modulation transmission between two kindred nodes.
Figure 3:
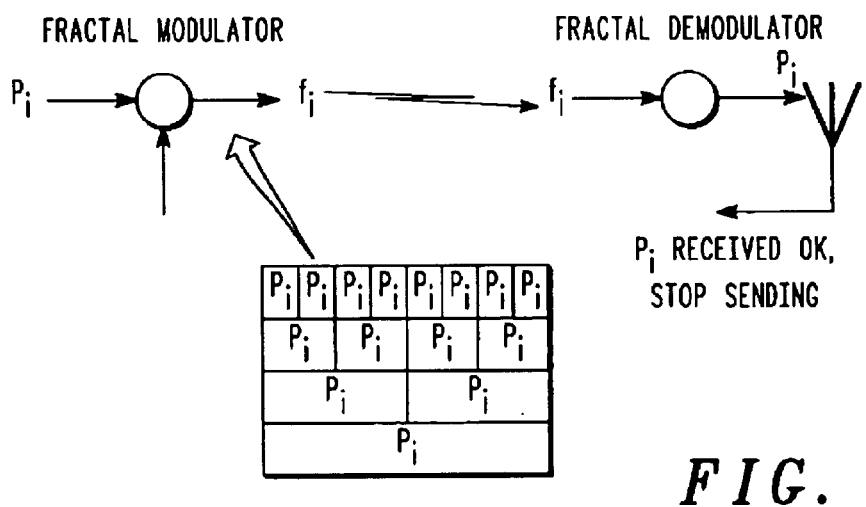
FIG. 3 illustrates the nodes of FIG. 2 in more detail.

In a preferred embodiment, the self-organizing network also includes fractal modulation, which implements a self-adaptive data transmission control, as illustrated in FIGS. 2 and 3. An early use of fractals is disclosed by Gregory W. Wornell, in "Signal Processing with Fractals", Prentice Hall Signal Processing Series, ISBN: 0-13-120999-X.

Fractal modulation can be used in a self-organizing network to optimize transmission performance when the channel bandwidth (quality) or duration is not known a prior. Fractal modulation provides multirate diversity and allows a network to optimally function in the absence of channel information or where a multiplicity of channels must be accommodated (broadcast to many). Referring to FIG. 2, node A sends a fractal representation of a data vector $p_i$ directly to node B. FIG. 3 illustrates a fractal modulator contained in node A, which receives data vector $p_i$ and modulates and transmits an appropriate frequency $f_i$ to a fractal demodulator in node B. Digital messages are transmitted simultaneously at multiple rates (symbols/second) as a fractal so that the data sequence, or packet, is represented n times at higher and higher modulation rates (see chart represented in FIG. 3). Receiving node B demodulates this fractal and accepts the fastest part of the transmission that achieves a desired received signal quality. Using IP/TCP protocols, as an example, receiving node B then transmits a "packet received satisfactory" message back to originating node A. Originating node A then immediately stops transmitting any more of that fractal data sequence and prepares to send any subsequent sequences in like manner. As a result, the transmission rate adjusts itself to the highest useful modulation rate without any a prior knowledge of the channel. The same fractal technique is used for both the initial flood message and the data messages of the self-organizing network. If desired, the flood message can be allowed to fully transmit so that all possible nodes in the network are discovered.

Figure 4:
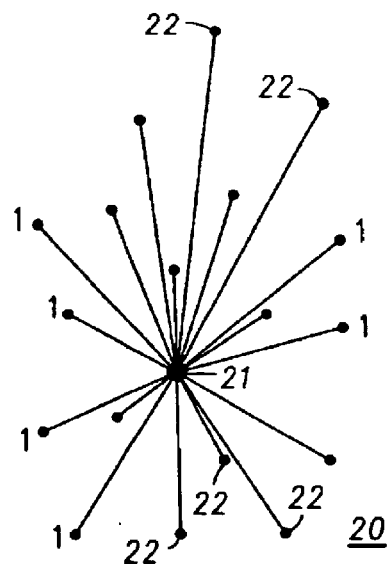
FIGS. 4 through 8 illustrate several optimal forms for changing situations within a self-organizing network in accordance with the present invention.

Turning now to FIG. 4, a centralized self-organizing network 20 is illustrated diagramatically. Network 20 includes a centralized hub node 21 and a plurality of kindred nodes 22. In this specific embodiment, hub node 21 typically repeats a data packet on the kindred retransmission frequencies for reception by all of the kindred nodes 22. Hub node 21 can be a modified kindred node or a special node provided specifically for the purpose of being a hub node.

Figure 5:
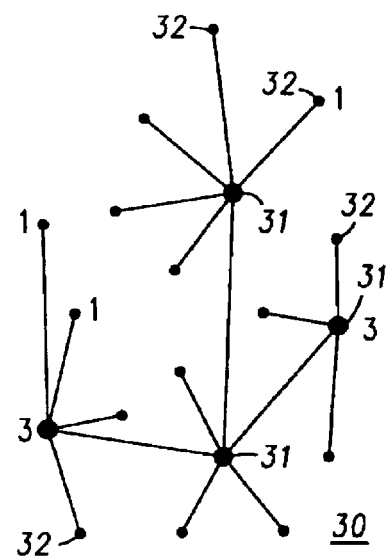

Turning now to FIG. 5, a decentralized self-organizing network 30 is illustrated diagramatically. In this specific embodiment a plurality of hub nodes 31 are provided and each hub node 31 has a plurality of kindred nodes 32 associated with it. Each hub node 31 and its associated kindred nodes 32 operate similar to the centralized network 20 of FIG. 4. However, in this embodiment hub nodes 31 have an additional, separate set of trunking frequencies and/or modulation schemes for longer range communication with other hub nodes 31. Generally, the additional, separate set of trunking frequencies and/or modulation schemes are inaccessible to kindred nodes 32. Typically, when a hub node 31 repeats a data packet, it repeats on both the kindred retransmission frequencies and the hub retransmission frequencies.

In decentralized network 30, all nodes 31 and 32 are presumed to conform to rules needed to be part of network 30. In actual practice, networks can extend their reach by using existing information systems via gateways, For example, the links among the hub nodes 31 in decentralized network 30 may be traditional wireless or wireline links, So long as one "side" of hub nodes 31 can exchange packets with kindred nodes 32, the traditional data transport facilities can be used to link hub nodes 31 to one another. Similarly, if hub nodes 31 are gateway nodes, then traditional satellite or radio transmission facilities can be used to link hub nodes 31 together.

Figure 6:
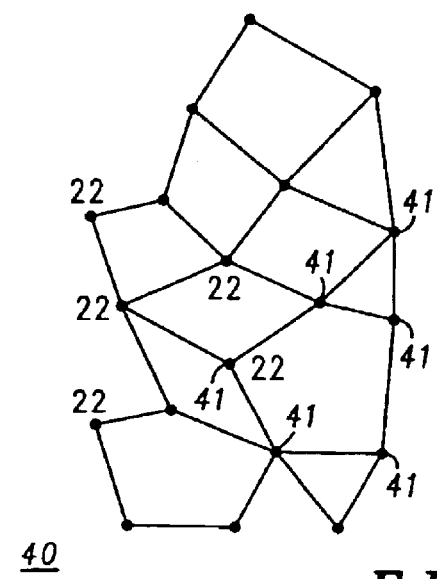

Referring specifically to FIG. 6, a distributed self-organizing network 40 is illustrated. Network 40 includes a plurality of kindred nodes 41 with each kindred node 41 generally communicating with adjacent kindred nodes 41. Generally, kindred nodes 41 are "peers" in the sense that they all rely on identical protocols for transmitting, receiving, and relaying (retransmitting) data packets for their peers. Each kindred node 41 also has the capability to adjust its transmit power up or down (within physical constraints imposed by its hardware) until its decision engine (see FIG. 1) determines that it can be heard by at least two other kindred nodes 41. The decision engine determines this range through observation of packet traffic already being relayed or through test packets that it may transmit from time to time during light traffic periods. Here it will be understood by those skilled in the art that each data packet includes information (e.g. priority, security, number of hops, etc.) and packet handling commands. The information and commands are used by the decision engine to perform the various operations.

One of the constraints in this self-organizing network is that the kindred nodes may not and need not know the physical location of other kindred nodes. Through the prior art packet flooding technique, a source node may find a destination node via a flood packet which is repeated by other nodes until the destination node receives the packet or until a maximum flood hop count contained in the flood packet is exceeded. Each time any packet is repeated, a hop counter accompanying the packet is incremented. In this way, each node that repeats the is packet develops a routing table that contains a hop count back to the source node.

When each kindred node or hub node (if any) receives one or more flood packets addressed to itself, the hop count in the flood packet is used to determine a maximum hop count, nmax, for a return acknowledgment message. Acknowledgment packets addressed to the source node are then repeated by any node whose routing table shows a path back to the source node with (nmax-k) or fewer hops, where k is the value taken from the hop counter in the acknowledgment packet. In this manner, from the collection of acknowledgment packets received, any node can also set its own nmax value for transmission of data packets to the destination node. At this point, transmission of data packets between the source node and the destination node can commence.

It is the decision engine's function to determine a value of nmax and an accompanying power setting for the transmitter in each of the nodes (e.g. the source and destination nodes described above). A large power setting for the transmitter in each of the source and destination nodes and a large value of nmax helps insure that data packets get through, but there is considerable duplication (packets with duplicate sequence numbers are discarded) and unnecessary bandwidth usage. Too small a setting for nmax and/or too low a power setting for the transmitter results in unreceived or unacknowledged packets, and ultimately the source node will have to re-flood to find the destination node, resulting in disrupted communications and wasted bandwidth in the re-flood. To strike a balance, the decision engine in each node uses its observations of network behavior and criteria of good connectivity based on a-prior of collected statistics to set an optimum value for each node's nmax and transmitter power.

Figure 7:
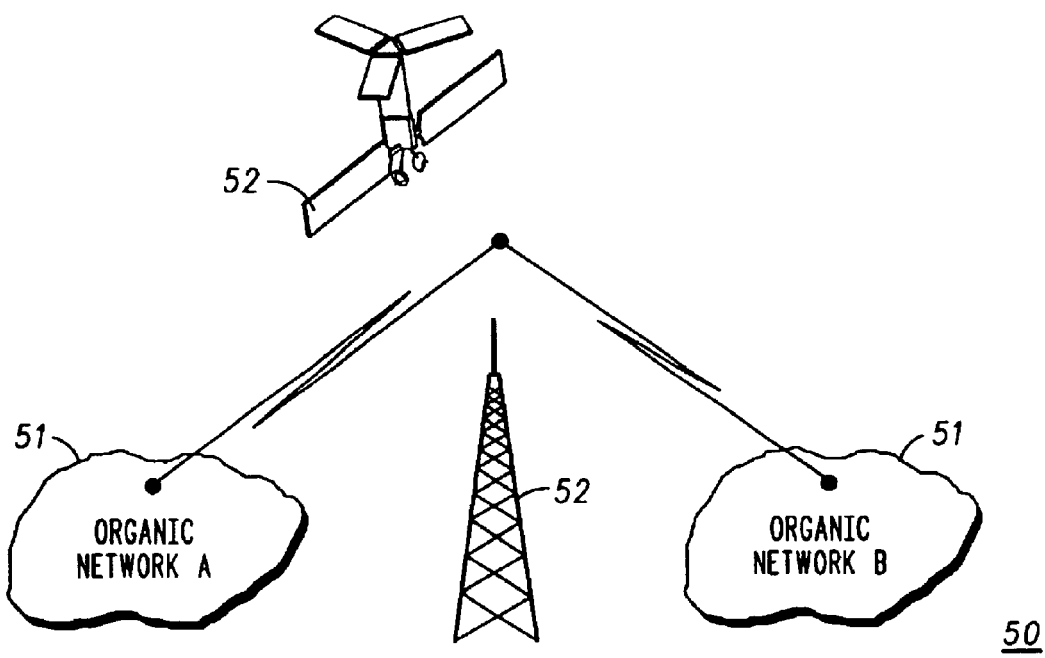

Referring to FIG. 7, self-organizing network 50 is illustrated including two or more distributed networks 51 and some number of hub nodes 52 with exceptionally high power and/or advantageous geographic locations. Hub nodes 52 may be mounted on mobile vehicles, they may be connected to tower antennas, they may be orbiting satellites, or the like. Hub nodes 52 generally have an additional, separate set of trunking frequencies and modulation schemes intended for longer range that are inaccessible to the kindred nodes in distributed networks 51 and that do not interfere with the kindred nodes. Generally, when a hub node 52 repeats a packet, it repeats on both the hub node and the kindred node transmission frequencies.

Via the addition of hub nodes 52 into network 50, the distributed networks 51 become a decentralized network, similar to network 30 of FIG. 5, with improved range and performance. Thus, through the use of satellites, tall antenna towers, etc., two disjointed self-organizing networks can be joined into one virtual self-organizing network. An important characteristic of distributed networks 51 is that the absolute geographic placement of the nodes is not critical and can change in real time. Overall performance of network 50 can be improved by adding more hub nodes 52 without requiring any changes in central data bases, switches, or other artifacts of traditional, static architectures.

Figure 8:
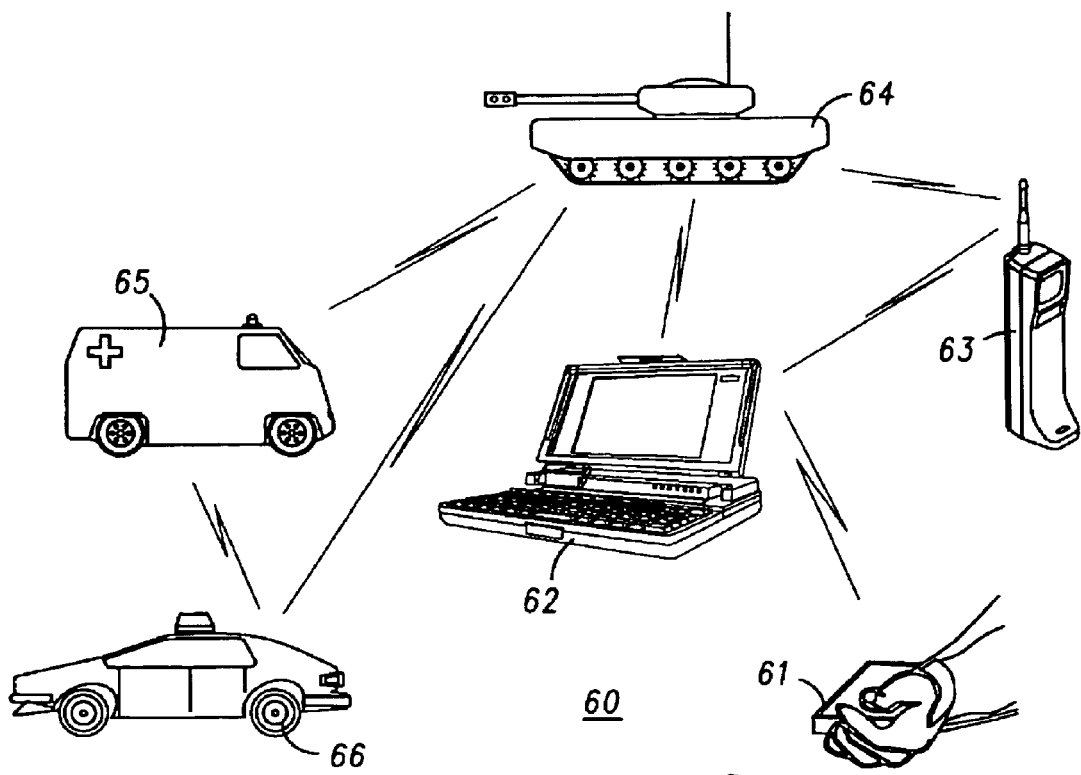

Turning to FIG. 8, some typical short-to-medium range nodes are illustrated in a self-organizing network 60. A typical example of a kindred node is a pager or other handheld communication device 61, a lap top computer 62, or a cellular phone 63. Examples of kindred or hub nodes include vehicles, such as a military tank 64, an ambulance 65 or a police car 66. It will be understood that any or all of these types of devices could be used in any of the various self-organizing networks described above. The present self-organizing network serves many purposes but is especially useful in mobile, wireless environments where the connecting links among the nodes may change randomly and unpredictably and where the networks cannot practically be pre-planned. Some examples are emergency force deployments for natural disasters and military engagements.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. In a self-organizing network including a plurality of kindred nodes and at least one hub node with a hub transmission frequency different than kindred transmission frequencies employed between kindred nodes, a method of communicating a data packet from a source node to a destination node remote from the source node comprising the steps of:

transmitting a test packet from the source node to at least some of the plurality of kindred nodes including the destination node;

determining a number of hops required to send the test packet from the source node to the destination node;

changing the transmission power of the source node to adjust the number of hops required to send the test packet from the source node to the destination node to an optimum number, including transmitting directly to 2% to 5% of the kindred nodes in the self-organizing network; and transmitting the data packet from the source node to the destination node via the optimum number of hops including changing the transmission frequency from a kindred transmission frequency to a hub transmission frequency.

2. A method as claimed in claim 1 wherein the step of changing the transmission power includes increasing the transmission power in steps to adjust the number of hops to the optimum number.

3. A method as claimed in claim 1 including in addition a step of determining a traffic load prior to the step of transmitting the data packet from the source node to the destination node and performing the step of changing the transmission frequency from the kindred transmission frequency to the hub transmission frequency when the traffic load is high.

4. A method as claimed in claim 1 including in addition a step of assigning a priority to each data packet and performing the step of transmitting the data packet from the source node to the destination node on higher priority data packets first.

5. A method as claimed in claim 4 including in addition steps of assigning a priority to each data packet and incorporating a user policy of transmitting only packets with a priority above a selected priority.

6. In a self-organizing network including a plurality of kindred nodes, a method of communicating a data packet from a source node to a destination node remote from the source node comprising the steps of:

transmitting a test packet from the source node to at least some of the plurality of kindred nodes at a known transmission power;

adjusting the transmission power until the destination node acknowledges receipt of the test packet;

determining a number of kindred nodes which received the transmission;

adjusting the transmission power of the source node until the number of kindred nodes plus two additional kindred nodes receive the transmission; and transmitting the data packet from the source node to the destination node via at least one of the plurality of kindred nodes.

7. A method as claimed in claim 6 wherein an optimum number of nodes is 2% to 5% of the kindred nodes in the self-organizing network.

8. A method as claimed in claim 6 wherein the step of transmitting the data packet from the source node to the destination node via at least one of the plurality of kindred nodes includes in addition steps of:

transmitting directly from a first kindred node to a second kindred node a digital message simultaneously at multiple rates to produce a fractal;

receiving the fractal at the second kindred node and accepting a fastest part of the fractal that achieves a desired received signal quality;

transmitting from the second kindred node a "received" message back to the first kindred node; and transmitting the data packet from the first kindred node to the second kindred node at a rate equal to the fastest part of the fractal that achieves the desired received signal quality.

9. In a self-organizing network including a plurality of kindred nodes, a method of communicating data packets from source nodes to destination nodes remote from the source nodes comprising the steps of:

including in each data packet information and packet handling commands;

receiving from kindred nodes in the self-organizing network at source nodes data packets with the information and packet handling commands;

adjusting operation of the source nodes in a way that allows the self-organizing network to be self-organizing, self-configuring, and self-healing, said self-healing comprising the steps of:

transmitting directly from a first kindred node to a second kindred node a digital message simultaneously at multiple rates to produce a fractal;

receiving the fractal at the second kindred node and accepting a fastest part of the fractal that achieves a desired received signal quality;

transmitting from the second kindred node a "received" message back to the first kindred node; and transmitting the data packet from the first kindred node to the second kindred node at a rate equal to the fastest part of the fractal that achieves the desired received signal quality; and retransmitting data packets from the source nodes to the destination nodes with a minimum of hops and delay.

* * * * *